United States Patent Office 3,136,740
Patented June 9, 1964

3,136,740
DI(ALKYLPHENYL MERCAPTIDE) SALTS FOR THE STABILIZATION OF POLYVINYL CHLORIDE
Peter Klemchuk, Yorktown Heights, and Martin Dexter, White Plains, N.Y., assignors to Geigy Chemical Corporation, New York, N.Y., a corporation of Delaware
No Drawing. Filed Nov. 27, 1961, Ser. No. 155,188
11 Claims. (Cl. 260—45.75)

This invention relates to certain new and useful salts of divalent heavy metals. In particular, the invention concerns di(mono- and poly-alkylphenyl mercaptide) salts of cadmium, barium and calcium.

Salts of organic materials are known as stabilizers for polymers of vinyl chloride and copolymers thereof with minor amounts of vinyl acetate, vinylidene chloride, etc. However, up to the present time, the extremely good thermal stability and superior properties of polymers and copolymers of vinyl chloride stabilized with the salts of the Formula I have not been known:

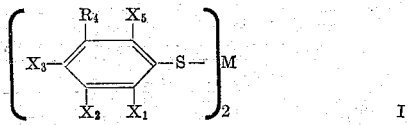

wherein $X_1$, $X_2$, $X_3$, $X_4$ and $X_5$ may be hydrogen or an alkyl group, with at least one X being an alkyl group, e.g. methyl, ethyl, propyl, butyl, amyl, hexyl, etc. Among such alkyl groups, the lower alkyl group is preferred, although the invention contemplates alkyl groups having as many as 18 carbon atoms; an especially preferred compound is the dimercaptide in which a tertiary butyl group is attached to the phenyl group in a position para to the sulfur atom; it is understood that bulky groups such as tertiary alkyl groups are not contemplated on adjacent carbon atoms of the phenyl nucleus;

M represents a divalent metal atom; the preferred metal atoms are cadmium, barium and calcium, cadmium being especially preferred.

Mixtures of salts of the Formula I are also very useful as stabilizers for polymers of vinyl chloride. Especially useful are mixtures of the barium salt of I with the cadmium salt of I. Useful proportions of each salt may range from trace quantities of one salt to equivalent quantities of each salt.

The stabilizers of the Formula I are incorporated into the polymeric material to be stabilized in conventional ways which are known to the art. Amounts of stabilizers may range from as little as 0.1% to 10% by weight, based on the unstabilized PVC polymer resin composition with 2% by weight being preferred.

The salts of the Formula I are prepared in quantitative yields by reacting the appropriate thiophenol or alkali metal mercaptide thereof with a suitable divalent metal salt. The insoluble salts are easily isolated by filtration, etc. in conventional ways.

The following examples are illustrative of the invention but the invention is not to limit the same thereto. In the examples, parts are by weight, unless otherwise indicated and the relationship between parts by weight and parts by volume is as that between grams and cubic centimeters. Temperatures are in degrees centigrade.

*Example I.—Cadmium Di(p-t-Butylphenyl Mercaptide)*

A solution of 8.0 parts of cadmium acetate in 30 parts by volume of methanol is added dropwise with stirring to a solution of 9.98 parts of p-t-butylthiophenol in 100 parts by volume of methanol. The product, cadmium di(p-t-butylphenyl mercaptide), precipitates as a white solid, whereupon 100 parts by volume of methanol are added and stirring continued for one half hour, after which the product is filtered, washed with methanol, dried so that 13.2 parts of product are obtained (quantitative yield). The analysis of product shows 25.31% cadmium found (theoretical 25.38%).

In a similar way, by using other alkylthiophenols, compounds such as the cadmium dimercaptides of tolylthiophenol, octylthiophenol, dodecylthiophenol, octadecylthiophenol, etc. are produced.

*Example II.—Cadmium Di(p-Nonylphenyl Mercaptide)*

A solution of 4.61 parts of cadmium acetate in 45 parts by volume of absolute methanol is added dropwise with stirring to a solution of 9.44 parts of p-nonylthiophenol in 90 parts by volume of methanol cooled over ice. The product from this reaction precipitates during the addition, whereupon the reaction mixture is cooled at about 10° overnight, after which the precipitate is filtered, washed with methanol and dried, yielding 10.9 parts of cadmium di(p-nonylphenol mercaptide), whose analysis for cadmium is 20.14% (theoretical 19.28%).

*Example III.—Barium Di(p-Tert.Butylphenyl Mercaptide)*

A solution of 95.5 parts by volume of barium oxide (prepared by dissolving 7 parts of barium oxide in 210 parts by volume of aqueous ethanol) is added dropwise with stirring to a solution of 6.85 parts of p-tert.butylthiophenol in 20 parts by volume of ethanol. The resulting mixture is concentrated to dryness on a steam bath to yield 10 parts of crude product which is then slurried in ether, filtered and dried so that the purified product, barium di(p-tert.butylphenyl mercaptide), is obtained in yield of 9.2 parts with analysis of 30.14% for barium (theoretical 29.36%).

In a similar way, by using other alkylthiophenols, compounds such as the barium dimercaptides of p-nonylphenylthiophenol, tolylthiophenol, 3,5-di-tert.butylphenylthiophenol, etc. are produced.

*Example IV.—Calcium Di(p-Tert.Butylphenyl Mercaptide)*

To a solution of 9.98 parts of p-tert.butylthiophenol in 100 parts by volume of ethanol are added 3.24 parts of sodium methylate. To the resultant mixture is added dropwise with stirring, 33.3 parts by volume of a calcium chloride solution (prepared by dissolving 10 parts of calcium chloride in 100 parts by volume of ethanol). The sodium chloride which precipitates during the addition is removed by filtration, after which the filtrate is concentrated to dryness on the steam bath to yield the residual product, calcium di(p-tert.butylphenyl mercaptide) in an amount of 10.86 parts with analysis for calcium being 11.95% (theoretical 10.81%).

In a similar way, by using other alkylthiophenols, compounds such as the calcium dimercaptides of tolylthiophenol, p-nonylthiophenol, p-dodecylthiophenol, p-octadecylthiophenol, etc. are produced.

*Example V.—Stabilized Polyvinyl Chloride*

A sample of stabilized resin is prepared by milling for 5 minutes at 135°, 50 parts of polyvinyl chloride resin (QYSM-5, Bakelite*, 25 parts of dioctyl phthalate

---

*Union Carbide Corporation, Bakelite Division, New York, N.Y. "Bakelite" QYSM-5 is a polyvinylchloride resin having typical viscosity values of 0.365 and 0.170 at 30.00° C. (0.4 gm./nitrobenzene) and 20.00° C. (0.2 gm./nitrobenzene), respectively, obtained by ASTM test method D-1243, method B.

and 1 part of cadmium di(p-t-butylphenyl mercaptide). The so stabilized resin is protected against thermal instability as evidenced by tests at 160°. The stabilized resin is compared with a blank for development of color and rated according to the Gardner color scale. After 120 minutes of exposure to 160° heat in the oven, the blank has a Gardner color rating of 13, while the stabilized resin has a Gardner color rating of 1.

In a similar way, stable polyvinyl chloride compositions are prepared by incorporating stabilizing amounts (2 parts per hundred of a stabilizer system, based on unstabilized resin) of each of the following:

(1) Barium di(p-t-butylphenyl mercaptide),
(2) Calcium di(p-t-butylphenyl mercaptide),
(3) Cadmium di(p-nonylphenyl mercaptide),
(4) Barium di(p-nonylphenyl mercaptide),
(5) Calcium di(p-nonylphenyl mercaptide),
(6) Barium di(p-t-butylphenyl mercaptide) and cadmium di(p-t-butylphenyl mercaptide) [1 part Ba salt to 1 part Cd salt],
(7) Barium di(p-nonylphenyl mercaptide) and cadmium di(p-nonylphenyl mercaptide) [1 part Ba salt to 1 part Cd salt].

What is claimed is:

1. Composition of matter which comprises polyvinyl chloride and at least one stabilizer of the formula:

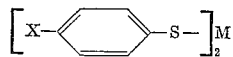

wherein X is alkyl of 1 to 18 carbon atoms and M is a divalent metal selected from the group consisting of calcium, cadmium and barium.

2. Composition of matter which comprises polyvinyl chloride and cadmium di(p-t-butylphenyl mercaptide).
3. Composition of matter which comprises polyvinyl chloride and barium di(p-t-butylphenyl mercaptide).
4. Composition of matter which comprises polyvinyl chloride and calcium di(p-t-butylphenyl mercaptide).
5. Composition of matter which comprises polyvinyl chloride and cadmium di(p-nonylphenyl mercaptide).
6. Composition of matter which comprises polyvinyl chloride and barium di(p-nonylphenyl mercaptide).
7. Composition of matter which comprises polyvinyl chloride and calcium di(p-nonylphenyl mercaptide).
8. Composition of matter which comprises polyvinyl chloride and a mixture of barium di(p-nonylphenyl mercaptide) and cadmium di(p-nonylphenyl mercaptide).
9. Composition of matter which comprises polyvinyl chloride and a mixture of barium di(p-tert.butylphenyl mercaptide) and cadmium di(p-tert.butylphenyl mercaptide).
10. Composition of matter which comprises polyvinyl chloride and a mixture of barium di(p-nonylphenyl mercaptide) and cadmium di(p-tert.butylphenyl mercaptide).
11. Composition of matter which comprises polyvinyl chloride and a mixture of barium di(p-tert.butylphenyl mercaptide) and cadmium di(p-nonylphenyl mercaptide).

References Cited in the file of this patent

UNITED STATES PATENTS

| 2,424,204 | Zimmer et al. | July 15, 1947 |
| 2,581,915 | Radcliffe | Jan. 8, 1952 |

FOREIGN PATENTS

| 918,067 | France | Jan. 29, 1947 |

UNITED STATES PATENT OFFICE
CERTIFICATE OF CORRECTION

Patent No. 3,136,740            June 9, 1964

Peter Klemchuk et al.

It is hereby certified that error appears in the above numbered patent requiring correction and that the said Letters Patent should read as corrected below.

Column 1, lines 22 to 27, the formula should appear as shown below instead of as in the patent:

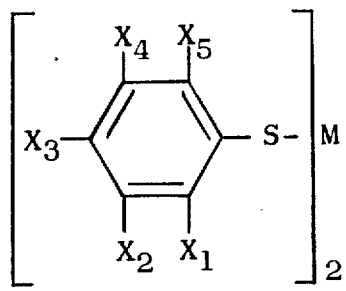

column 1, line 63, for "invention" read -- intention --.

Signed and sealed this 20th day of October 1964.

(SEAL)
Attest:

ERNEST W. SWIDER
Attesting Officer

EDWARD J. BRENNER
Commissioner of Patents